US012563183B2

(12) United States Patent
Lin et al.

(10) Patent No.: US 12,563,183 B2
(45) Date of Patent: Feb. 24, 2026

(54) BLOCK VECTOR STORING AND TOOL HARMONIZATION FOR BLOCK VECTOR RELATED VIDEO CODING

(71) Applicant: QUALCOMM Incorporated, San Diego, CA (US)

(72) Inventors: Po-Han Lin, Taipei (TW); Jian-Liang Lin, Su'ao Township (TW); Yao-Jen Chang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 65 days.

(21) Appl. No.: 18/755,330

(22) Filed: Jun. 26, 2024

(65) Prior Publication Data

US 2025/0008085 A1      Jan. 2, 2025

Related U.S. Application Data

(60) Provisional application No. 63/511,471, filed on Jun. 30, 2023.

(51) Int. Cl.
| | |
|---|---|
| *H04N 19/00* | (2014.01) |
| *H04N 19/105* | (2014.01) |
| *H04N 19/159* | (2014.01) |
| *H04N 19/176* | (2014.01) |

(52) U.S. Cl.
CPC ......... *H04N 19/105* (2014.11); *H04N 19/159* (2014.11); *H04N 19/176* (2014.11)

(58) Field of Classification Search
CPC .................................................... H04N 19/00
See application file for complete search history.

(56) References Cited

U.S. PATENT DOCUMENTS

| | | | | |
|---|---|---|---|---|
| 11,470,340 | B2 * | 10/2022 | Xu .......................... | H04N 19/52 |
| 2021/0037256 | A1 * | 2/2021 | Zhang .................. | H04N 19/105 |
| 2024/0022763 | A1 * | 1/2024 | Chen .................... | H04N 19/159 |

FOREIGN PATENT DOCUMENTS

WO        2024015110 A1      1/2024

OTHER PUBLICATIONS

Coban M., et al., "Algorithm Description of Enhanced Compression Model 8 (ECM 8)", 141. MPEG Meeting, Online, (Motion Picture Expert Group or ISO/IEC JTC1/SC29/WG11), Joint Video Experts Team (JVET) of ITU-T SG 16 WP 3 and ISO/IEC JTC 1/SC 29, 29th Meeting, by teleconference, Jan. 11-Jan. 20, 2023, No. JVET-AC2025 (-v1), n22374, Apr. 21, 2023, XP030308573, 74 pages, Sections 3.1.7, 3.2.14, 3.2.24.

(Continued)

*Primary Examiner* — Maryam A Nasri
(74) *Attorney, Agent, or Firm* — Shumaker & Sieffert, P.A.

(57) ABSTRACT

A method of encoding or decoding video data includes storing a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; deriving a candidate list of BVs for the subsequent block based on BVs from the history BV list that includes the BV for the current block; and encoding or decoding the subsequent block based on the candidate list of BVs.

20 Claims, 11 Drawing Sheets

(56) References Cited

OTHER PUBLICATIONS

International Search Report and Written Opinion—PCT/US2024/035868—ISA/EPO—Oct. 9, 2024 (15 pp).

Lim W., et al., "AHG12: Using Block Vector Derived from IntraTMP for IBC", Joint Video Experts Team (JVET) of ITU-T SG 16 WP 3 and ISO/IEC JTC 1/SC 29, 27th Meeting, by teleconference, Jul. 13-Jul. 22, 2022, No. JVET-AA0053-V2, m60018, Jul. 13, 2022, XP030302742, 4 pages, abstract, Sections 1, 3.

Lim W., et al., "EE2-Related: Modifications of EE2-3.2 and EE2-3.3", Joint Video Experts Team (JVET) of ITU-T SG 16 WP 3 and ISO/IEC JTC 1/SC 29, 28th Meeting, Mainz, DE, Oct. 20-Oct. 28, 2022, No. JVET-AB0062-v2, m60790, Oct. 21, 2022, XP030304488, 6 pages, abstract, Sections 2, 3.

Zhu C., et al., "Non-EE2: IntraTMP with HMVP Candidates", Joint Video Experts Team (JVET) of ITU-T SG 16 WP 3 and ISO/IEC JTC 1/SC 29, 33rd Meeting, by teleconference, Jan. 17-Jan. 26, 2024, No. JVET-AG0074-v3, Jan. 15, 2024, XP030313915, pp. 1-3, the whole document.

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 29 20th Meeting, by Teleconference, Oct. 7-16, 2020, pp. 1-515.

Chen J., et al., "Algorithm Description for Versatile Video Coding and Test Model 10 (VTM 10)", JVET-S2002-v1, Joint Video Experts Team (JVET)of ITU-T SG 16 WP 3 and ISO/IEC JTC 1/SC 29/WG 1119th Meeting: by teleconference, Jun. 22-Jul. 1, 2020, pp. 1-99, JVET-S2002-v2.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

Chen J., et al., "Algorithm Description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting, Marrakech, MA, Jan. 9-18, 2019, pp. 1-64.

Coban M., et al., "Algorithm Description of Enhanced Compression Model 10 (ECM 10)", JVET-AE2025, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.

Cui K., et al., "EE2-2.6: ARMC Merge Candidate List Reordering for AMVP-Merge Mode", JVET-AC150-v2, Joint Video Experts Team (JVET) of ITU-T SG 16 WP 3 and ISO/IEC JTC 1/SC 29 29th Meeting, by teleconference, Jan. 11-20, 2023, pp. 1-3.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.

Lin J-L., et al., "Non-EE2: Fixes Related to Intra TMP", JVET-AE0124-V2, Joint Video Experts Team (JVET) of ITU-T SG 16 WP 3 and ISO/IEC JTC 1/SC 29 31st Meeting, Geneva, CH, Jul. 11-19, 2023, pp. 1-5.

Seregin V., et al., "Exploration Experiment on Enhanced Compression Beyond VVC capability (EE2)", JVET-AE2024-v2, Joint Video Experts Team (JVET) of ITU-T SG 16 WP 3 and ISO/IEC JTC 1/SC 29 31st Meeting, Geneva, CH, Jul. 11-19, 2023, pp. 1-13.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.

Wang Y-K., et al., "High Efficiency Video Coding (HEVC) Defect Report", JCTVC-N1003-v1, JCTVC-N1003, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, 311 Pages.

Yu Y., et al., "EE2-2.6: IntraTMP Block Vector Storing", JVET-AF0079-v2, Joint Video Experts Team (JVET) of ITU-T SG 16 WP 3 and ISO/IEC JTC 1/SC 29 32nd Meeting, Hannover, DE, Oct. 13-20, 2023, pp. 1-4.

Yu Y., et al., "Non-EE2: On IntraTMP Block Vector", JVET-AE0075-v3, Joint Video Experts Team (JVET) of ITU-T SG 16 WP 3 and ISO/IEC JTC 1/SC 29 31st Meeting, Geneva, CH, Jul. 11-19, 2023, pp. 1-2.

* cited by examiner

400

PREDICT CURRENT BLOCK

402

CALCULATE RESIDUAL BLOCK
FOR CURRENT BLOCK

404

TRANSFORM AND QUANTIZE
RESIDUAL BLOCK

406

SCAN TRANSFORM
COEFFICIENTS OF RESIDUAL
BLOCK

408

ENTROPY ENCODE
TRANSFORM COEFFICIENTS

410

OUTPUT ENTROPY ENCODED
DATA OF BLOCK

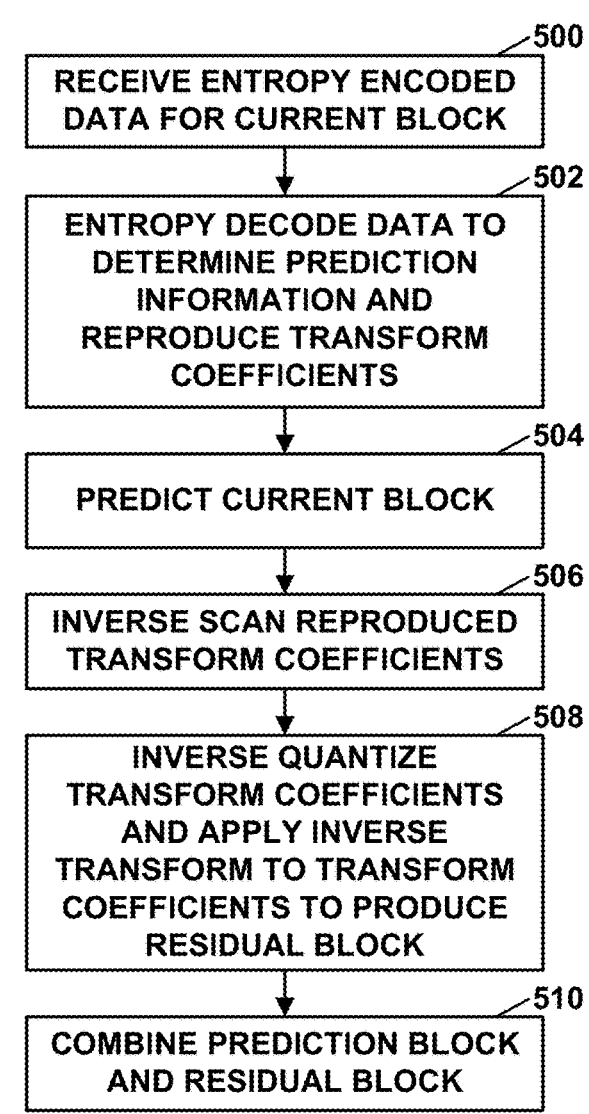

500

RECEIVE ENTROPY ENCODED
DATA FOR CURRENT BLOCK

502

ENTROPY DECODE DATA TO
DETERMINE PREDICTION
INFORMATION AND
REPRODUCE TRANSFORM
COEFFICIENTS

504

PREDICT CURRENT BLOCK

506

INVERSE SCAN REPRODUCED
TRANSFORM COEFFICIENTS

508

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK

510

COMBINE PREDICTION BLOCK
AND RESIDUAL BLOCK

LUMA COMPONENT
900

CHROMA COMPONENT
902

STORE BV FOR A CURRENT BLOCK IN A HISTORY BV LIST FOR ENCODING OR DECODING A SUBSEQUENT BLOCK                                    1100

DERIVE CANDIDATE LIST OF BVs FOR SUBSEQUENT BLOCK BASED ON BVs FROM HISTORY BV LIST THAT INCLUDES THE BV FOR THE CURRENT BLOCK       1102

ENCODE OR DECODE SUBSEQUENT BLOCK BASED ON CANDIDATE LIST OF BVs                                                         1104

BLOCK VECTOR STORING AND TOOL HARMONIZATION FOR BLOCK VECTOR RELATED VIDEO CODING

This application claims the benefit of U.S. Provisional Application No. 63/511,471, filed Jun. 30, 2023, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for block vector (BV) related tools which include IBC (Intra block copy) and IntraTMP (intra template matching prediction), and tools such as the BV storing process and pruning process, including harmonization with other tools. The example techniques may improve the coding efficiency of BV related tools. As described in more detail, if a current block is encoded or decoded using IntraTMP mode, a BV for that current block may be available in a history BV list for encoding or decoding a subsequent block. The history BV list includes BVs of blocks that may not neighbor the subsequent block. With the example techniques, the improvement in the BV related tools may result in reduced bandwidth utilization and/or increased storage efficiency. Accordingly, the example techniques may improve the overall operation of a video encoder and/or a video decoder and improve the performance of a video coding system.

In one example, the disclosure describes a method of encoding or decoding video data, the method comprising: storing a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; deriving a candidate list of BVs for the subsequent block based on BVs from the history BV list that includes the BV for the current block; and encoding or decoding the subsequent block based on the candidate list of BVs.

In one example, the disclosure describes a device for encoding or decoding video data, the device comprising: one or more memories configured to store the video data; and processing circuitry coupled to the one or more memories, wherein the processing circuitry is configured to: store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; derive a candidate list of BVs for the subsequent block based on BVs from the history BV list that includes the BV for the current block; and encode or decode the subsequent block based on the candidate list of BVs.

In one example, the disclosure describes a computer-readable storage medium having stored thereon instructions that, when executed, cause one or more processors to: store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; derive a candidate list of BVs for the subsequent block based on BVs from the history BV list that includes the BV for the current block; and encode or decode the subsequent block based on the candidate list of BVs.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example method for decoding a current block in accordance with the techniques of this disclosure.

DETAILED DESCRIPTION

Figure 1:
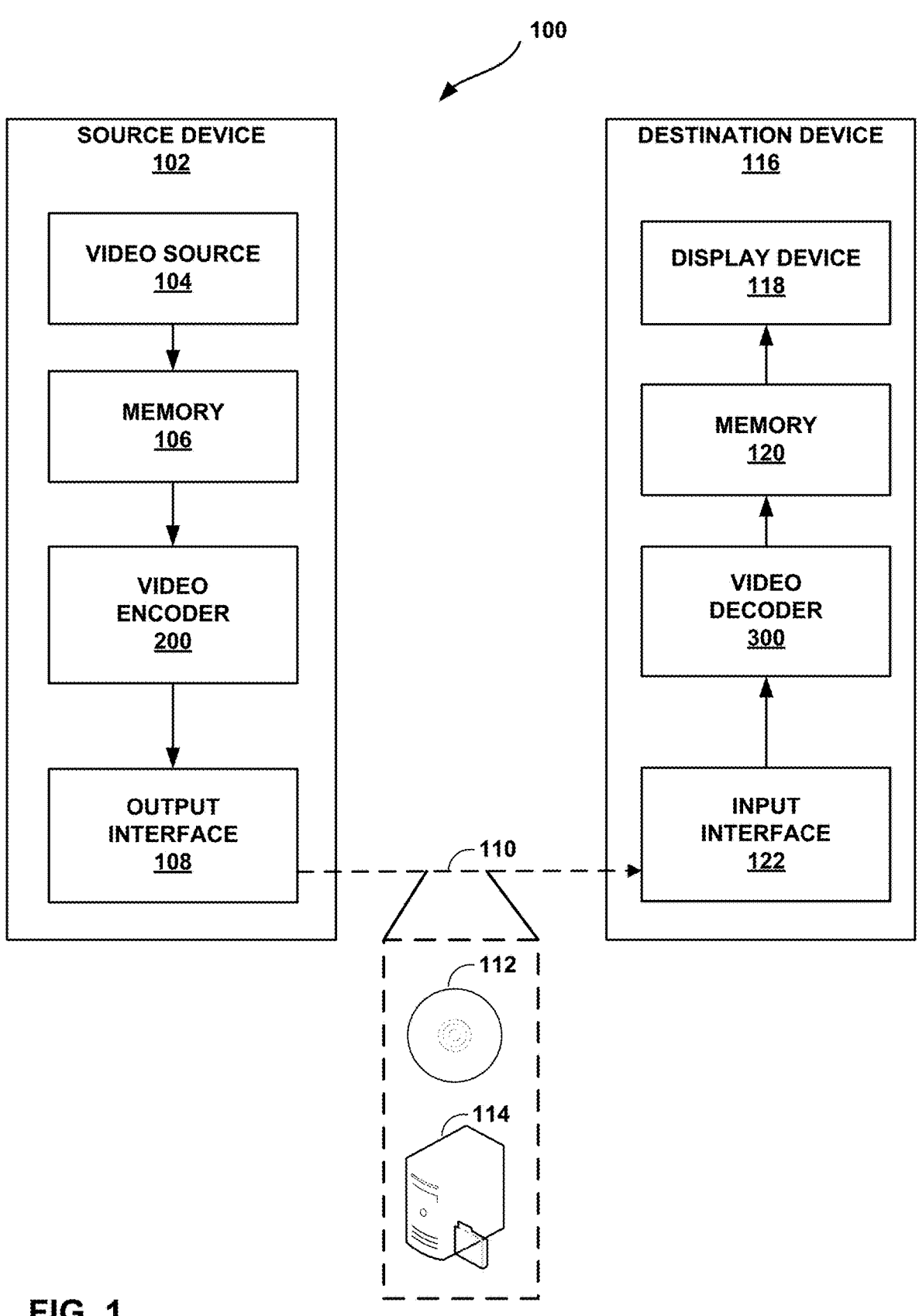
FIG. 1 is a block diagram illustrating an example video encoding and decoding system that may perform the techniques of this disclosure.

Block vector (BV) based video coding is a video coding tool in which a video coder (e.g., video encoder or video decoder) uses a block vector to identify a block in the same picture as a current block being encoded or decoded. There may be various uses of block vectors, such as for intra block copy (IBC) (e.g., IBC mode), where the block identified by the block vector is used to generate a prediction block for the current block. However, the block vector may be used for other video coding tools as well, such as intra template matching prediction (IntraTMP) mode. In IntraTMP mode, the BV identifies a block in the same picture, and is determined based on template matching of templates of reference blocks in the same picture and a template of the current block.

There may be inefficiencies in the manner in which block vectors are stored and/or utilized, resulting in less coding gains, inefficient memory usage, or reduced image quality. The example techniques described in this disclosure relate to BV storing process, pruning process, or harmonization with other tools and methods, which may improve the coding efficiency of BV related tools including IBC and IntraTMP.

For example, for determining a BV for a block, a video coder may derive a candidate list of BVs, where the candidate list of BVs include BVs from previously encoded or decoded blocks. The video encoder may signal and the video decoder may receive an index into the candidate list of BVs, and the video decoder may determine a BV based on the index.

This disclosure describes example techniques in which a BV for a current block that is encoded or decoded in IntraTMP mode is stored in a history BV list. For instance, in video coding, there may be spatial motion vector prediction (SMVP), temporal motion vector prediction (TMVP), and history based motion vector prediction (HMVP). Block vectors may not be indicative of motion, and are therefore called BVs instead of MVs (motion vectors). However, the convention of SMVP, TMVP, and HMVP is sometimes still used with BVs. To avoid confusion, this disclosure describes spatial BVs, temporal BVs, and history BVs, which may be similar to SMVP, TMVP, and HMVP, respectively.

For example, there may be a spatial BV list for a block that includes BVs (i.e., spatial BVs) from neighboring blocks in the same picture. The BVs in the spatial BV list may be stored in accordance with positional information (e.g., above, left, above-left, etc. or equivalent information such as coordinates). There may be a temporal BV list for a block that includes BVs (i.e., temporal BVs) from co-located blocks in other pictures. There may be a history BV list for a block that includes BVs (i.e., history BVs) from blocks in the same picture that are not necessarily neighboring blocks. The BVs in the history BV list may be stored in coding order (e.g., if the history BV list is full, the earliest history BV is removed and the latest history BV is added).

In some examples, the candidate list of BVs may include BVs from one or more of the spatial BV list, temporal BV list, and the history BV list.

There may be various ways in which a video coder may store BVs in the spatial BV list, temporal BV list, and the history BV list. As one example, the video coder, or some other circuitry, may reserve memory locations for each of the spatial BV list, temporal BV list, and the history BV list. As another example, the video coder, or some other circuitry, may tag pictures as being part of the spatial BV list, temporal BV list, and the history BV list. There may be other ways in which the video coder may store BVs in the spatial BV list, temporal BV list, and the history BV list, and the techniques are not limited to any specific technique for storing BVs in the spatial BV list, temporal BV list, or history BV list. Moreover, there may not necessarily be a spatial BV list, temporal BV list, and history BV list in all examples.

In some techniques, if a current block is encoded or decoded in IntraTMP mode, the BV for the current block was not available as a history BV for a subsequent block that is encoded or decoded in IBC mode or IntraTMP mode. Stated another way, the BV for the current block, encoded or decoded in IntraTMP mode, was not stored in the history BV list, and therefore is not available for encoding or decoding the subsequent block in such techniques.

There may be coding inefficiencies in excluding BVs from a block encoded or decoded in IntraTMP mode. For instance, the BV of a current block encoded or decoded in IntraTMP mode may identify a block for a subsequent block that forms a better prediction signal for the subsequent block than other blocks. In accordance with one or more examples described in this disclosure, by storing a BV for a current block in a history BV list, where the current block is encoded or decoded in IntraTMP mode, when the video encoder or video decoder derive the candidate list of BVs for the subsequent block, the BV of the current block may be available for encoding or decoding the subsequent block. This may result in a better prediction signal for the subsequent block and reduced signaling, as compared to other techniques.

In some examples, to store the BV for the current block, rather than storing an actual BV for the current block, the video encoder or video decoder may perform one of clipping or rounding of the actual BV for the current block. The video encoder or video decoder may store the clipped or rounded BV for the current block. Clipping may include maintaining the integer part of the actual BV and discarding the fractional part of the actual BV, resulting in a BV having integer precision. Rounding may include rounding the actual BV up or down to integer precision.

By clipping or rounding the actual BV for the current block prior to storing, the memory utilization may be reduced, as there is reduced information that needs to be stored. Also, there may be little impact on the video quality if clipping or rounding of the actual BV for the current block is performed before storing.

There may be various other video coding gains that may be realized, but are not required in all cases, by utilizing the techniques described in this disclosure. For example, the video encoder or video decoder may perform template matching techniques for determining a prediction signal for the subsequent block. For template matching techniques, there is a starting vector that is utilized, and the video encoder and the video decoder search for a block within a search range relative to the starting vector having a template that best matches a template of the subsequent block. The number choices for starting vectors can be relatively large (e.g., any vector could be a starting vector). Also, by having too many starting vectors, and evaluating search ranges for each of the starting vectors, such techniques can increase computation time by an undesirable amount.

In one or more examples, the video encoder and the video decoder may utilize one or more of the BVs in the candidate list, including the history BVs as starting vectors and search for a block within search ranges relative to each of the starting vectors. In this manner, the number of starting vectors is limited, while also increasing the likelihood that the search ranges for one of the starting vectors will result in identifying the best block used for generating a prediction signal.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for block vector storage and harmonization. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for block vector storage and harmonization. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use block vectors, such as in IBC or IntraTMP.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure is generally related to defining different methods (e.g., template type, fusion) and syntax using in the template matching (TM) related tools, such as with BV (block vector). The disclosed techniques may be applied to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)). In this following, HEVC, JEM techniques and works in Versatile Video Coding (VVC) are described.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are studied the potential need for standardization of future video coding technology with a compression capability that significantly exceeds that of the HEVC standard (including its current extensions and near-term extensions for screen content coding and high-dynamic-range coding). The groups worked together on this exploration activity in a joint collaboration effort known as the Joint Video Exploration Team (JVET) to evaluate compression technology designs proposed by their experts in this area. The latest version of reference software, i.e., VVC Test Model 10 (VTM 10) could be downloaded from: https://vcgit.hhi.fraunhofer.de/jvet/VVCSoftware_VTM. The Versatile Video Coding (VVC) draft specification could be referred to JVET-T2001. Algorithm description of Versatile Video Coding and Test Model 10 (VTM 10.0) could be referred to JVET-T2002.

The following describes intra template matching. Intra template matching prediction (IntraTMP) is an intra prediction mode that copies the best prediction block from the reconstructed part of the current frame, whose L-shaped template matches the current template. For a predefined search range, video encoder 200 searches for the most similar template to the current template in a reconstructed part of the current frame and uses the corresponding block as a prediction block. Video encoder 200 then signals the usage of this mode, and the same prediction operation is performed at the decoder side with video decoder 300. In some examples, the predefined search range may be relative to a starting block vector. In one or more examples described in this disclosure, a BV of a current block encoded or decoded in IntraTMP mode may be usable as the starting block vector for a subsequent block that is encoded or to be decoded in IntraTMP mode.

Figure 6:
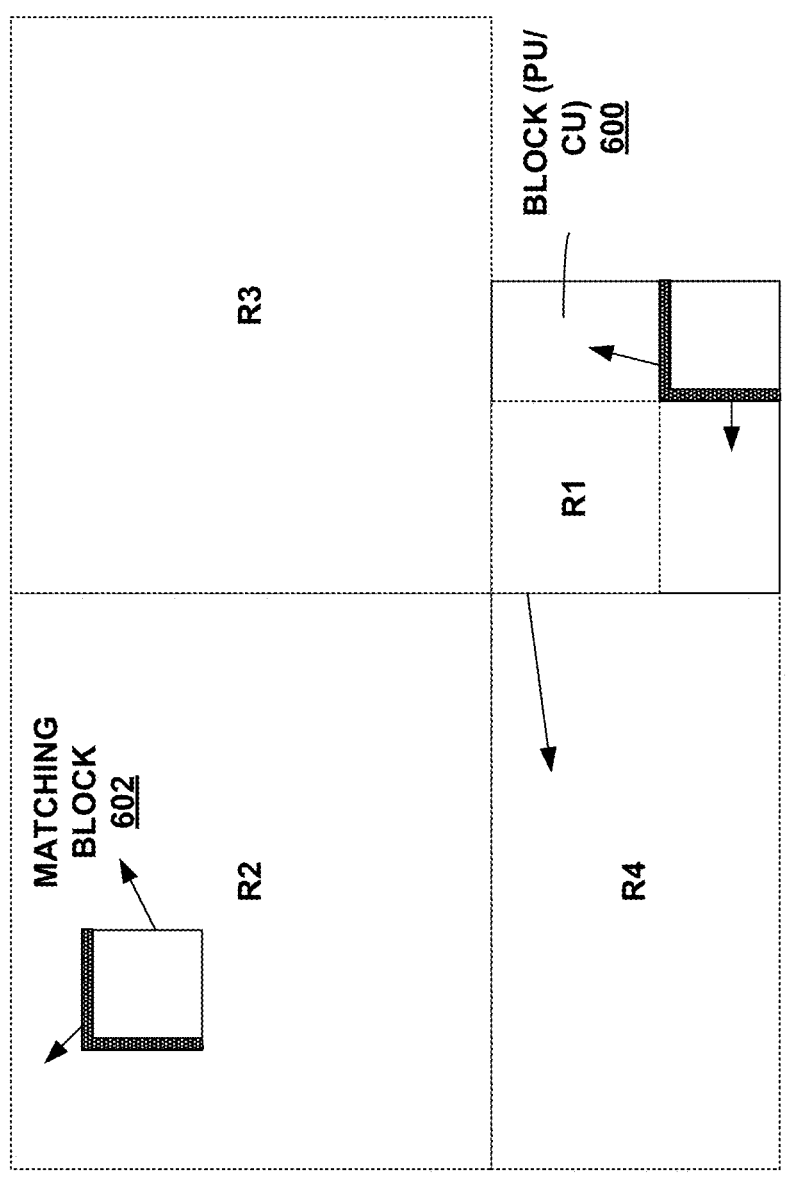
FIG. 6 is a conceptual diagram illustrating an example of intra template matching search area.

The prediction signal is generated by matching the L-shaped causal neighbor of the block 600 with another block in a predefined search area in FIG. 6 including: R1: current CTU; R2: top-left CTU; R3: above CTU; R4: left CTU. Sum of absolute differences (SAD) is used as a cost function.

Within each region, video decoder 300 searches for the template that has least SAD with respect to the current one and uses its corresponding block as a prediction block. The dimensions of all regions (SearchRange_w, SearchRange_h) may be set proportional to the block dimension (BlkW, BlkH) to have a fixed number of SAD comparisons per pixel. That is:

$$SearchRange\_w = a * BlkW$$

$$SearchRange\_h = a * BlkH$$

Where 'a' is a constant that controls the gain/complexity trade-off. In practice, 'a' is equal to 5.

The Intra template matching tool is enabled for CUs with size less than or equal to 64 in width and height. This maximum CU size for Intra template matching is configurable. The Intra template matching prediction mode is signaled at CU level through a dedicated flag when DIMD (decoder-side intra mode derivation) is not used for current CU.

The following describes intra block copy (IBC). Intra block copy (IBC) is a tool adopted in HEVC extensions on SCC (screen content coding). IBC may improve the coding efficiency of screen content materials. Since IBC mode is implemented as a block level coding mode, block matching (BM) is performed at video encoder 200 to find the optimal block vector (or motion vector) for each CU. A block vector is used to indicate the displacement from the current block to a reference block, which is already reconstructed inside the current picture. The luma block vector of an IBC-coded CU is in integer precision. The chroma block vector rounds to integer precision as well. When combined with AMVR (adaptive motion vector resolution), the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. Video encoder 200 performs RD (rate distortion) check for blocks with either width or height no larger than 16 luma samples. For non-merge mode, the block vector search is performed using hash-based search first. If hash search does not return valid candidate, block matching based local search may be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected. In block matching search, the search range is set to cover both the previous and current CTUs.

At CU level, IBC mode is signaled with a flag, and the flag can be signaled as IBC AMVP mode or IBC skip/merge mode as follows:

a. IBC skip/merge mode: a merge candidate index is used to indicate which of the block vectors in the list from neighboring candidate IBC coded blocks is used to predict the current block. The merge list consists of spatial, HMVP, and pairwise candidates.

b. IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

The following describes IBC merge/AMVP (advance motion vector prediction) list construction. The IBC merge/AMVP list construction is modified as follows:

a. Only if an IBC merge/AMVP candidate is valid, it can be inserted into the IBC merge/AMVP candidate list.

b. Above-right, bottom-left, and above-left spatial candidates and one pairwise average candidate can be added into the IBC merge/AMVP candidate list.

c. Template based adaptive reordering (ARMC-TM) is applied to IBC merge list.

The HMVP (history-based motion vector prediction) table size for IBC is increased to 25. Again, as noted above, although BVs may not necessarily indicate "motion" similar to motion vectors (MVs), the term "HMVP" may still be applied to BVs as a naming convention. To avoid confusion, in this disclosure, HMVP, as applied to BVs, is referred to as history BVs.

After up to 20 IBC merge candidates are derived with full pruning, the merge candidates are reordered together. After reordering, the first 6 candidates with the lowest template matching costs are selected as the final candidates in the IBC merge list.

The zero vectors' candidates to pad the IBC Merge/AMVP list are replaced with a set of BVP candidates located in the IBC reference region. A zero vector is invalid as a block vector in IBC merge mode, and consequently, may be discarded as BVP in the IBC candidate list.

Figure 7:
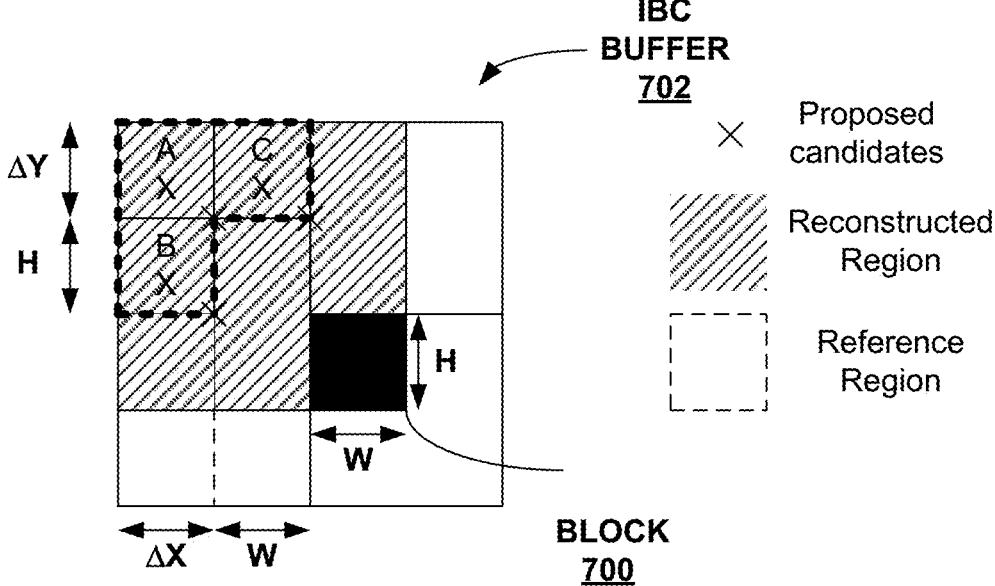
FIG. 7 is a conceptual diagram illustrating an example of padding candidates for the replacement of a zero-vector in an intra block copy (IBC) list.
Figure 8A:
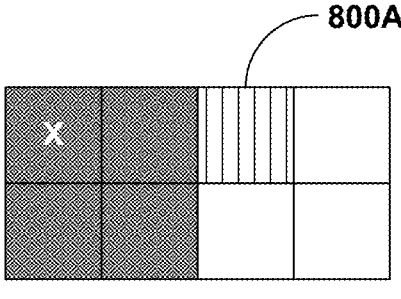
FIGS. 8A-8D are conceptual diagrams illustrating IBC reference region depending on current coding unit (CU) position.
Figure 8B:
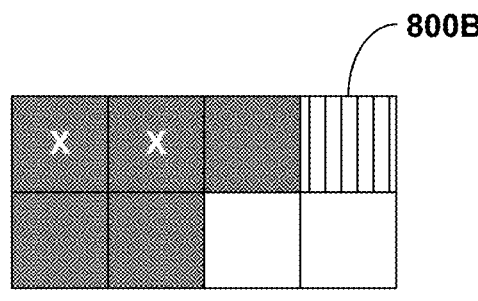
Figure 8C:
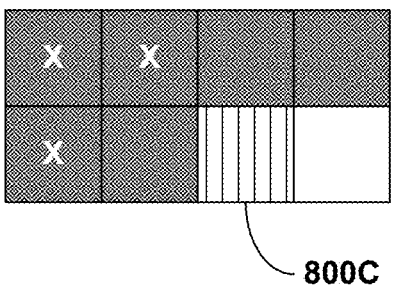
Figure 8D:
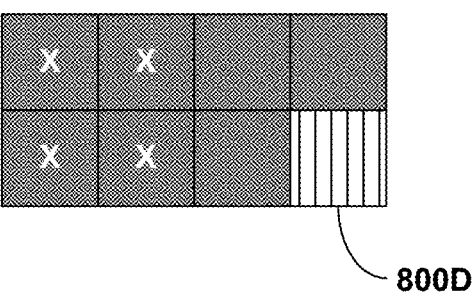

Three candidates are located on the nearest corners of the reference region, and three additional candidates are determined in the middle of the three sub-regions (A, B, and C), whose coordinates are determined by the width, and height of the current block and the ΔX and ΔY parameters, as is depicted in FIG. 7 for block 700 and IBC buffer 702.

The following describes IBC with template matching. Template Matching is used in IBC for both IBC merge mode and IBC AMVP mode.

The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (–W, 0), top (0, –H) and top-left (–W, –H), where W is the width and H the height of the current CU.

In the IBC-TM merge mode, the selected candidates are refined with the Template Matching method prior to the RDO or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the two first ones may then be considered in the motion estimation process as usual.

The Template Matching refinement for both IBC-TM merge and AMVP modes may be based in accordance with a condition that IBC motion vectors are constrained (i) to be integer and (ii) within a reference region as shown in FIGS. 8A-8D with blocks 800A-800D. In IBC-TM merge mode, all refinements may be performed at integer precision, and in IBC-TM AMVP mode, all refinements may be performed either at integer or 4-pel precision depending on the AMVR value. Such a refinement accesses only to samples without interpolation, in some examples. In one or more examples, the refined motion vectors and the used template in each refinement step may be in accordance with the constraint of the reference region.

Figure 9:
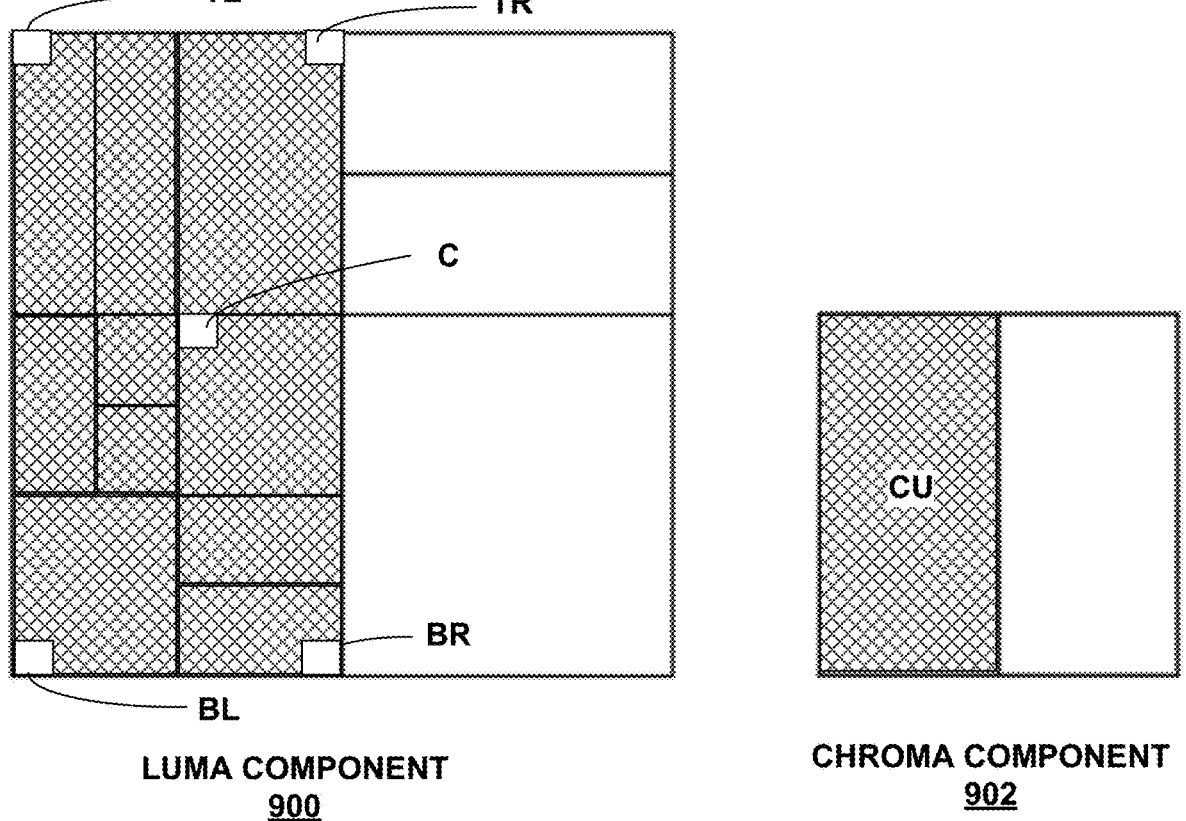
FIG. 9 is a conceptual diagram illustrating an example of luma block used to drive direct block vector.

The following describes direct BV in intra chroma coding. The direct block vector is used for chroma block in dual tree slices. When chroma dual tree is activated, a flag is signaled to indicate whether a chroma block is coded using IBC mode. If one of the luma blocks in five locations shown in FIG. 9 for luma component 900 is coded with IBC or intraTMP mode, the block vector for the luma block is scaled and is used as block vector for the chroma block of chroma component 902. Template matching may be used to perform block vector scaling.

To improve the coding efficiency of block vector (BV) related tools which includes IBC and IntraTMP, the BV storing process, pruning process or harmonization with other tools methods are described in this disclosure.

The following describes examples for spatial BV buffer storing mechanism for BV-related tools. The following is described with examples that may be combined or implemented separately.

In one example, if the current block uses IntraTMP, the BV of the current block is stored to a spatial BV buffer with the position information of the current block. The BV information could be referenced by a later coded block to derive the spatial BV candidates. Stated another way, video encoder 200 and video decoder 300 may store a BV for a current block in a spatial BV list for encoding or decoding a subsequent block, where the current block is encoded or decoded in IntraTMP mode. For instance, for the subsequent block, BVs for blocks that neighbor the subsequent block may be available in the spatial BV list such as where the current block is a neighboring block of the subsequent block. In one or more examples, the spatial BV list may include BVs that are used to form a candidate list of BVs for encoding or decoding the subsequent block. The subsequent block may be encoded or decoded in IntraTMP mode or IBC mode.

In one example, if the current block uses IBC, the BV of the current block is stored to a spatial BV buffer with the position information of the current block. The BV information could be referenced by a later coded block to derive the spatial BV candidates. Stated another way, video encoder 200 and video decoder 300 may store a BV for a current block in a spatial BV list for encoding or decoding a subsequent block, where the current block is encoded or decoded in IBC mode. For instance, for the subsequent block, BVs for blocks that neighbor the subsequent block may be available in the spatial BV list such as where the current block is a neighboring block of the subsequent block. In one or more examples, the spatial BV list may include BVs that are used to form a candidate list of BVs for encoding or decoding the subsequent block. The subsequent block may be encoded or decoded in IntraTMP mode or IBC mode.

In one example, when storing the BV to the spatial BV buffer, if the current block uses IntraTMP mode, only the integer part of the BV will be stored to the buffer, the fractional part will be discarded. In one example, when storing the BV to the spatial BV buffer, if the current block uses IBC mode, only the integer part of the BV will be stored to the buffer, the fractional part will be discarded. In one example, a rounding function is applied to transfer the true BV to integer precision.

In one example, the stored BV information could be reference by a coded block in other frame or picture to derive a temporal BV candidate or temporal BV predictor. That is, the subsequent block may be a block in another picture, and the current block in the current picture may be co-located with the subsequent block in the other picture. In this example, the BV of the current block may be a temporal BV for the subsequent block, and video encoder 200 and video decoder 300 may use the BV of the current block (e.g., the temporal BV) to determine the BV for the subsequent block.

In one example, if the horizontal or vertical fractional BV is –0.5 or +0.5, then the fractional BV may be rounded to zero before the BV is stored to a second BV buffer (which is different from the BV buffer mentioned above). In one example, if horizontal or vertical fractional BV is –0.5 or 0.5, an exception may be to round the BV to the value of –1 or 1, and this –1 or +1 is stored to the second BV buffer.

The following describes history BV list storing mechanism for BV-related tools. The following is described with examples that may be combined or implemented separately.

In one example, if the current block uses IntraTMP, the BV of the current block is stored to a history BV list, the order of list is depended on the decoding order of the blocks. The BV information could be referenced by a later coded block to derive the history BV candidates.

Stated another way, video encoder 200 and video decoder 300 may store a BV for a current block in a history BV list for encoding or decoding a subsequent block. In this example, the current block is encoded or decoded in IntraTMP mode. As described above, there may be various examples of BV lists. For instance, the spatial BV list may store BVs of neighboring blocks. The history BV list may include BVs for block that do not neighbor the subsequent block. For example, the current block may not be a neighboring block of the subsequent block, and therefore, the BV of the current block is in the history BV list for the subsequent block.

An order of BVs in the history BV list may be based on coding order of the blocks including the current block. For example, the history BV list may be a first-in-first-out (FIFO) list. After or during video encoder 200 encoding and video decoder 300 decoding a current block, video encoder 200 and video decoder 300 may store the BV of the current block in the spatial BV list and the history BV list. If the history BV list is full, video encoder 200 and video decoder

300 may remove the earliest stored BV in the history BV list, and add the BV of the current block.

Assume that the subsequent block is a plurality of blocks later in coding order than the current block that is encoded or decoded in IntraTMP mode, such that the current block is not neighboring the subsequent block, and that one of the neighboring blocks of the subsequent block is encoded or decoded in IntraTMP mode or IBC mode. When video encoder 200 and video decoder 300 are to encode or decode the subsequent block, the BV of the current block may not be available in the spatial BV list for the subsequent block, but may be available in the history BV list for the subsequent block.

In one or more examples, video encoder 200 and video decoder 300 may derive a candidate list of BVs for the subsequent block based on BVs from the history BV list that includes the BV for the current block. For example, video encoder 200 and video decoder 300 may add BVs from blocks neighboring the subsequent block (e.g., from the spatial BV list for the subsequent block) to an initial candidate list. Video encoder 200 and video decoder 300 may add BVs from the history BV list to the initial candidate list.

In some examples, this initial candidate list may be the candidate list. However, in some other examples, video encoder 200 and video decoder 300 may reorder and/or prune the initial candidate list to derive the candidate list. For example, video encoder 200 and video decoder 300 may determine template matching costs for BVs in the initial candidate list, and derive the candidate list of BVs based on the template matching costs for the BVs in the initial candidate list.

For instance, as described above, the size of the history BV list (e.g., HMVP table noted above) may be 25 entries of BVs. Video encoder 200 and video decoder 300 may add 20 BVs into the initial candidate list from spatial BV list and history BV list with pruning and reordering (e.g., there are not two instances of the same BV in the initial candidate list and the initial candidate list is reordered based on various factors). To derive the candidate list for the subsequent block, video encoder 200 and video decoder 300 may select the first 6 candidates with the lowest template matching costs. The above is one example way in which to derive the candidate list of BVs for the subsequent block based on the BVs from the history BV list, but the example techniques are not limited to the above example.

Video encoder 200 and video decoder 300 may encode or decode the subsequent block based on the candidate list. The subsequent block may be encoded or to be decoded in IntraTMP mode or IBC mode. In one or more examples, video encoder 200 and video decoder 300 may utilize each of the BVs in the candidate list of BVs as a starting BV for a template matching process associated with each of the BVs. Video encoder 200 and video decoder 300 may determine a prediction signal for the subsequent block based on the template matching process associated with each of the BVs. In this example, video encoder 200 and video decoder 300 may encode or decode, as applicable, the subsequent block based on the prediction signal.

In some examples, to decode the subsequent block, video decoder 300 may determine a prediction signal based on at least one BV in the candidate list of BVs. Video decoder 300 may receive residual information indicative of a difference between the prediction signal and the subsequent block, and reconstruct the subsequent block based on the prediction signal and the residual information.

In some examples, to encode the subsequent block, video encoder 300 may determine a prediction signal. At least one BV in the candidate list of BVs identifies or is used to identify a block used to derive the prediction signal. Video encoder 300 may determine residual information indicative of a difference between the prediction signal and the subsequent block, and signal the residual information.

In one example, if the current block uses IBC, the BV of the current block is stored to a history BV list, the order of list is depended on the decoding order of the blocks. The BV information could be referenced by a later coded block to derive the history BV candidates. Stated another way, video encoder 200 and video decoder 300 may store a BV for a current block in a history BV list for encoding or decoding a subsequent block, where the current block is encoded or decoded in IBC mode. For instance, for the subsequent block, BVs for blocks that do not neighbor the subsequent block may be available in the history BV list such as where the current block is not neighboring the subsequent block. In one or more examples, the history BV list may include BVs that are used to form a candidate list of BVs for encoding or decoding the subsequent block. The subsequent block may be encoded or decoded in IntraTMP mode or IBC mode.

In one example, when storing the BV to the history BV list, if the current block uses IntraTMP mode, only the integer part of the BV will be stored to the list, the fractional part will be discarded. In one example, when storing the BV to the history BV list, if the current block uses IBC mode, only the integer part of the BV will be stored to the list, the fractional part will be discarded. In one example, a rounding function is applied to transfer the true BV to integer precision.

Stated another way, as described above, video encoder 200 and video decoder 300 may store the BV for the current block (e.g., in the history BV list or the spatial BV list). To store the BV for the current block, video encoder 200 and video decoder 300 may one of clip or round an actual BV for the current block to generate a clipped or rounded BV for the current block, and store the clipped or rounded BV for the current block. Clipping may include maintain the integer part of the BV, and discarding the fractional part. Rounding may include increasing or decreasing a value of the BV to closest integer value.

The following describes BV candidate derivation from spatial BV buffer and history BV list. The following is described with examples that may be combined or implemented separately.

In one example, a BV candidate derivation process is applied in IntraTMP to derive the starting point for the template matching process. In one example, a BV candidate derivation process is applied in IBC to derive the starting point for the IBC template matching process.

That is, video encoder 200 and video decoder 300 may utilize each of the BVs in the candidate list of BVs as a starting BV for a template matching process associated with each of the BVs. Video encoder 200 and video decoder 300 may determine a prediction signal for the subsequent block based on the template matching process associated with each of the BVs. Video encoder 200 may encode and video decoder 300 may decode the subsequent block based on the prediction signal.

In one example, in the derivation process, the spatial candidates may be derived first and then history candidates (e.g., in history BV list) may be derived later if the number of the candidates is less than a predefined value N. In one example, only the spatial candidates may be derived for the IntraTMP. In one example, if at least one available candidate is derived, the search range of the template matching process is restricted to a smaller region. If no available candidate is found, a larger search range is used.

In one example, a BV candidate derivation process is applied in IBC to derive the MVP candidate or merge candidate, in the process, the spatial candidates may be derived first and then history candidates may be derived later if the number of the candidates is less than a predefined value N. In one example, when deriving the BV candidates, if the distance of a new candidate and a previous inserted candidate is less than a threshold TH, the new candidate may be pruned and not inserted to the candidate list.

In one example, the threshold TH is one integer pel. In one example, the threshold is dependent on the block size, the width of the coded block, or the height of the coded block.

The following describes BV derivation for direct BV mode in intra chroma coding. The following is described with examples that may be combined or implemented separately.

When video encoder 200 or video decoder 300 store a BV of an IntraTMP-coded with finer BV precision, it may cause some errors when chroma block re-uses the BV of the corresponding luma block. In one example, when direct BV mode is applied to the current chroma block, the corresponding luma BV may be rounded to an integer value, and this rounded value may be used to derive chroma BV.

In one example, if a neighboring block is coded with direct BV, and the BV of the neighboring block is a zero BV or a BV with horizontal shift and vertical shift both smaller than CU width and CU height (which indicates the reference chroma block will be overlapped with the current chroma block), then the intra chroma mode is derived to be PLA-NAR mode instead of direct BV mode. In one example, in DBV (direct block vector) mode, when luma BV is in fractional BV, video encoder 200 and video decoder 300 may round the fraction BV to an integer BV for the corresponding chroma block.

In some examples, there are two precisions in the same block area. The fractional one is for luma, and integer one is for chroma. In one example, the fractional BV is stored in that block area, and in another example, the integer BV is stored in that block area. If integer BV is stored in that block area, this integer BV may be scaled to the luma picture size based on the chroma picture size.

The following describes overlapped block motion compensation (OBMC) interaction with IBC and IntraTMP. The following is described with examples that may be combined or implemented separately.

In one example, there is a high-level flag (ex. PPS, SPS or slice header) to indicate that OBMC is applied or not when the current block uses IntraTMP. In one example, there is a high-level flag (ex. PPS, SPS or slice header) to indicate that OBMC is applied or not when the current block uses IBC. In one example, there is a high-level flag (cx. PPS, SPS or slice header) to indicate that OBMC is applied or not when the neighboring block or the current block uses IntraTMP. In one example, there is a high-level flag (ex. PPS, SPS or slice header) to indicate that OBMC is applied or not when the neighboring block or the current block uses IBC.

Figure 2:
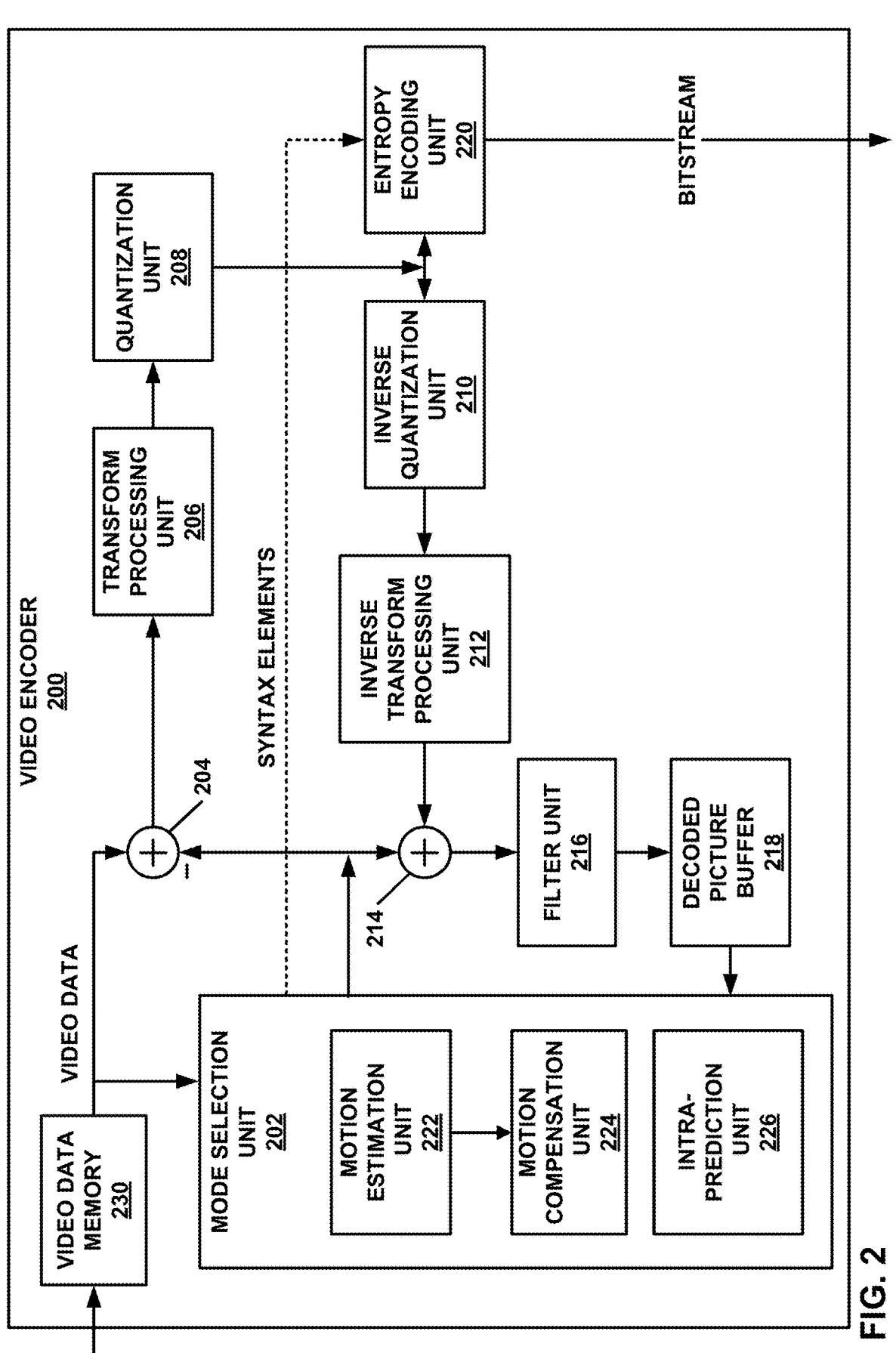
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered.

Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit

220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the example techniques described in this disclosure.

Figure 3:
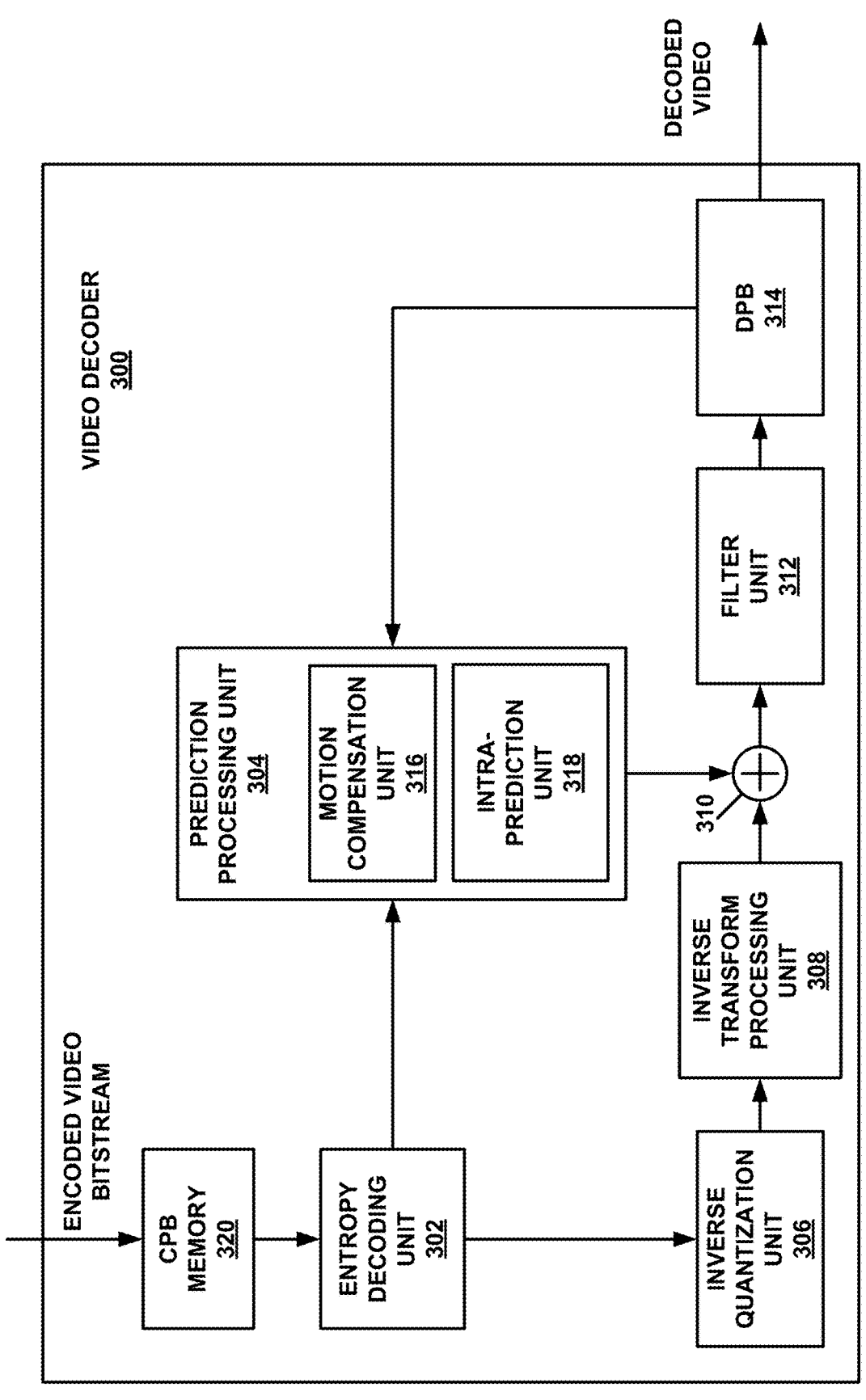
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the example techniques described in this disclosure.

Figure 4:
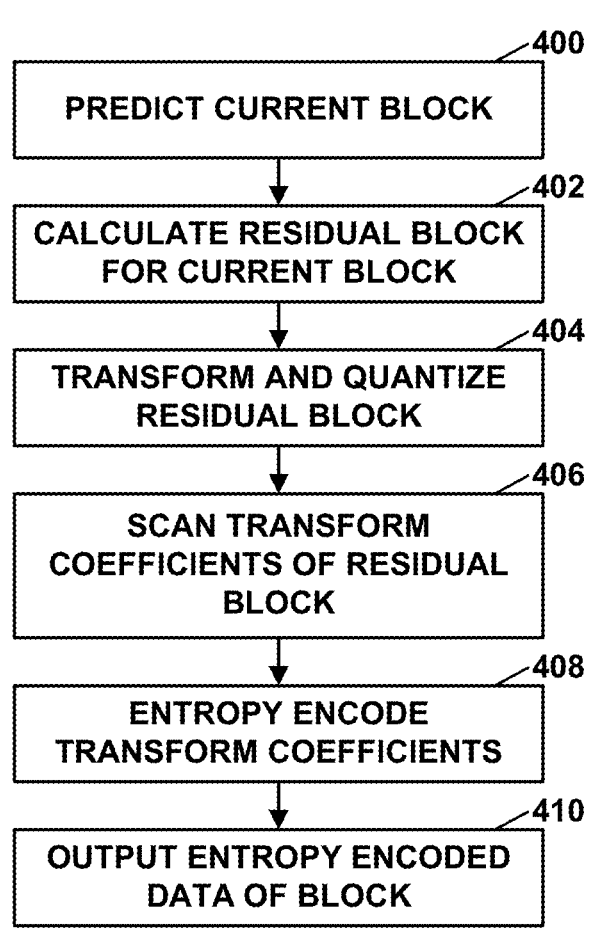
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block (e.g., using the techniques described in this disclosure). Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block (e.g., using the techniques described in this disclosure). Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 10A:
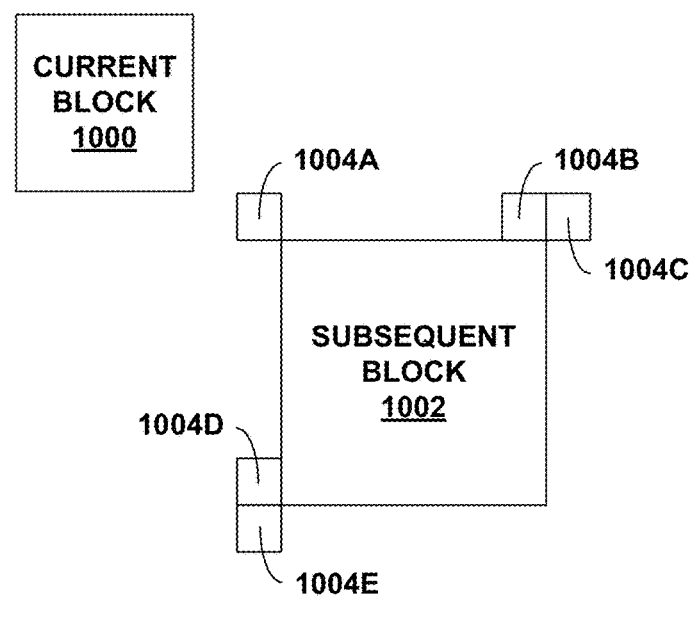
FIGS. 10A and 10B are conceptual diagrams illustrating examples for storing block vector (BV) information and deriving a candidate list of BVs.
Figure 10B:
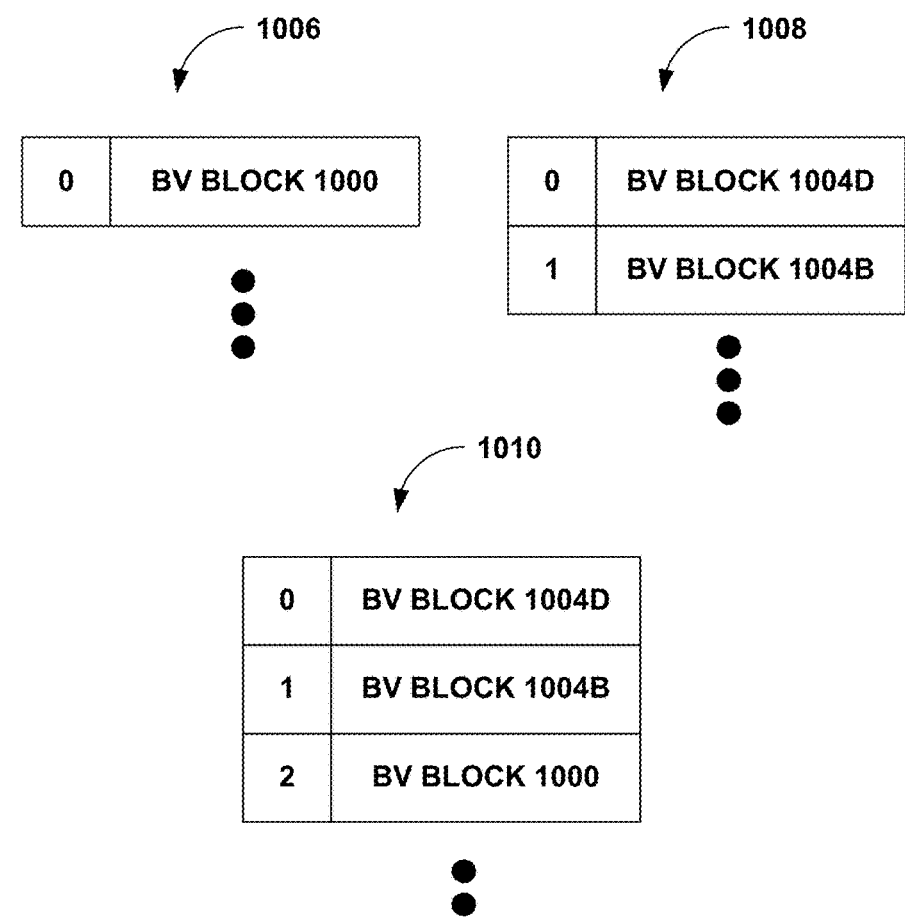

FIGS. 10A and 10B are conceptual diagrams illustrating examples for storing block vector (BV) information and deriving a candidate list of BVs. FIG. 10A illustrates current block 1000 and subsequent block 1002. Current block 1000 may not neighbor subsequent block 1002. In FIG. 10A, neighboring blocks 1004A-1004E may neighbor subsequent block 1002. Current block 1000 may be encoded or decoded in IntraTMP mode, and subsequent block 1002 may be encoded or decoded in IntraTMP mode or IBC mode. In other examples, current block 1000 may be encoded or decoded in IBC mode. Subsequent block 1002 follows current block 1000 in coding order, and subsequent block 1002 and current block 1000 may be in the same picture.

FIG. 10B illustrates history BV list 1006, spatial BV list 1008, and candidate list of BVs 1010. In the example illustrated in FIGS. 10A and 10B, video encoder 200 and video decoder 300 may store a BV for current block 1000 in history BV list 1006 for encoding or decoding subsequent block 1002. In some examples, to store the BV for current block 1000, video encoder 200 and video decoder 300 may one of clip or round an actual BV for current block 1000 to generate a clipped or rounded BV for current block 1000. Video encoder 200 and video decoder 300 may store the clipped or rounded BV for current block 1000.

For example, as illustrated in FIG. 10B, video encoder 200 and video decoder 300 may store BV of current block 1000 in index 0 of history BV list 1006. In general, an order of BVs in history BV list 1006 may be based on coding order of the blocks including current block 1000. For instance, current block 1000 may be stored as index 0 in history BV list 1006 because the BV of current block 1000 was the most recent BV of a block that does not neighbor subsequent block 1002. History BV list 1006 is one example, and there may be other ways in which to generate history BV list 1006 such as based on tagging blocks, etc. That is, it may not be necessary in every example to dedicate separate memory for history BV list 1006, but dedication of separate memory for history BV list 1006 is possible.

As illustrated in FIG. 10B, video encoder 200 and video decoder 300 may store BVs of neighboring blocks 1004A-1004E in spatial BV list 1008. For instance, in FIG. 10B, assume that neighboring blocks 1004D and neighboring blocks 1004B are encoded and decoded in IntraTMP mode or IBC mode. Therefore, for neighboring blocks 1004D and neighboring blocks 1004B, video encoder 200 and video decoder 300 may store the respective BVs in spatial BV list 1008 at index 0 and index 1, respectively. Spatial BV list 1008 may also store position information of neighboring block 1004D and neighboring block 1004B. The other neighboring blocks 1004A, 1004C, and 1004E may not be encoded or decoded in IntraTMP mode or IBC mode in this example, and therefore, may not have an associated BV.

Video encoder 200 and video decoder 300 may derive candidate list of BVs 1010 for subsequent block 1002 based on BVs from history BV list 1006 that includes the BV for the current block 1000. For example, as illustrated in FIG. 10B, video encoder 200 and video decoder 300 may add BVs from blocks neighboring subsequent block 1002 to an initial candidate list (e.g., BV for block 1004D is in index 0, and BV for block 1004B is in index 1 for candidate list of BVs 1010). Video encoder 200 and video decoder 300 may add BVs from history BV list 1006 to the initial candidate list. For example, index 0 for candidate list of BVs 1010 includes the BV of current block 1000. In some examples, initial candidate list may be set as candidate list of BVs 1010. However, in some examples, there may be pruning and/or reordering of the initial candidate list to generate candidate list of BVs 1010. For example, video encoder 200 and video decoder 300 may determine template matching costs for BVs in the initial candidate list, and derive candidate list of BVs 1010 based on the template matching costs for the BVs in the initial candidate list.

Figure 11:
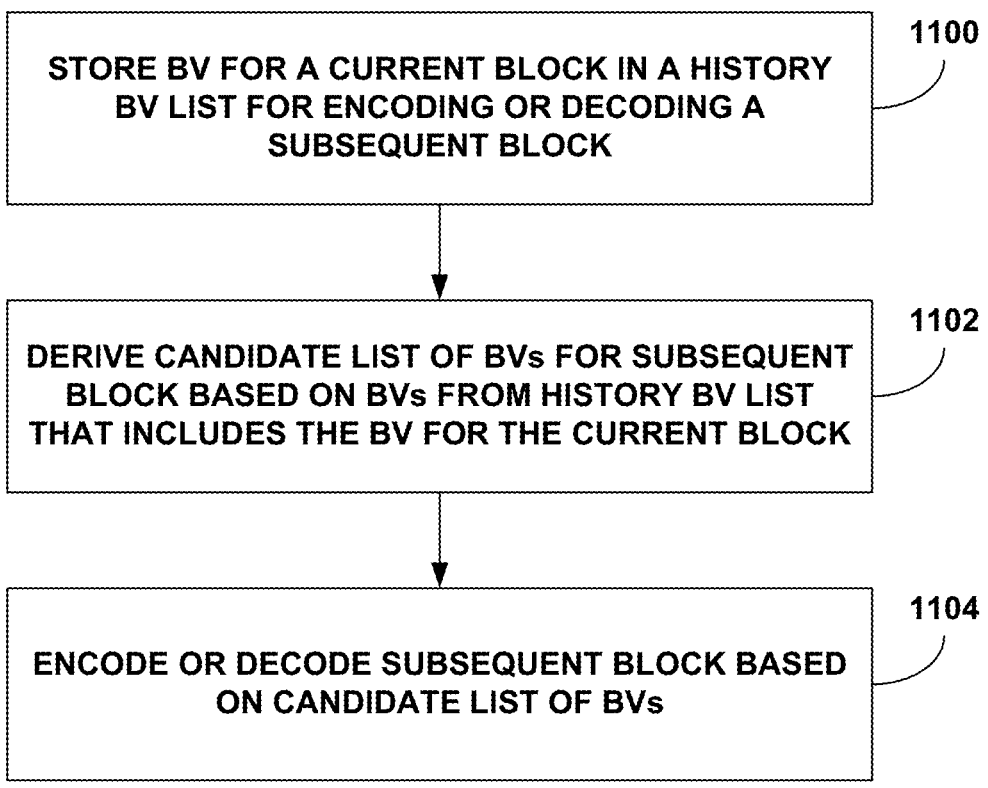
FIG. 11 is a flowchart illustrating a method of operation in accordance with one or more examples described in this disclosure.

FIG. 11 is a flowchart illustrating a method of operation in accordance with one or more examples described in this disclosure. In the example of FIG. 11, one or more memories may be configured to store video data. Examples of the one or more memories include memory 106, memory 120, video data memory 230, decoded picture buffer 218, CPB memory 320, DPB 314, or other memory of video encoder 200 or video decoder 300. Processing circuitry may be coupled to the one or more memories. Examples of the processing circuitry include processing circuitry of video encoder 200 or video decoder 300. For ease, reference is made to FIG. 10.

The processing circuitry of video encoder 200 or video decoder 300 may store a BV for a current block 1000 in a history BV list 1006 for encoding or decoding a subsequent block 1002 (1100). In one or more examples, the current block 1000 may be encoded or decoded in IntraTMP mode. The history BV list 1006 may include BVs for blocks that do not neighbor the subsequent block 1002, and in some examples, an order of BVs in the history BV list 1006 is based on coding order of the blocks including the current block 1000. Current block 1000 may not be a neighboring block of subsequent block 1002.

In some examples, to store the BV for the current block 1000, the processing circuitry of video encoder 200 or video decoder 300 may one of clip or round an actual BV for the current block 1000 to generate a clipped or rounded BV for the current block 1000. The processing circuitry of video encoder 200 or video decoder 300 may store the clipped or rounded BV for the current block 1000.

The processing circuitry of video encoder 200 or video decoder 300 may derive a candidate list of BVs 1010 for the subsequent block 1002 based on BVs from the history BV list 1006 that includes the BV for the current block 1000 (1102). For example, the processing circuitry of video encoder 200 or video decoder 300 may add BVs from blocks neighboring the subsequent block 1002 (e.g., such as those of spatial BV list 1008) to an initial candidate list, and add BVs from the history BV list 1006 to the initial candidate list. In some examples, the initial candidate list may be the candidate list of BVs 1010. However, in some examples, there may be additional pruning and/or reordering. For example, the processing circuitry of video encoder 200 or video decoder 300 may determine template matching costs for BVs in the initial candidate list, and derive the candidate list of BVs 1010 based on the template matching costs for the BVs in the initial candidate list.

The processing circuitry of video encoder 200 or video decoder 300 may encode or decode the subsequent block 1002 based on the candidate list of BVs 1010 (1104). As an example, the processing circuitry of video encoder 200 or video decoder 300 may utilize each of the BVs in the candidate list of BVs 1010 as a starting BV for a template matching process associated with each of the BVs. The processing circuitry of video encoder 200 or video decoder 300 may determine a prediction signal for the subsequent block 1002 based on the template matching process associated with each of the BVs. To encode or decode the subsequent block 1002, the processing circuitry of video encoder 200 or video decoder 300, as appliable, may be configured to encode or decode the subsequent block 1002 based on the prediction signal.

As one example, to encode or decode the subsequent block, the processing circuitry of video decoder 300 may be configured to decode the subsequent block 1002. To decode the subsequent block 1002, the processing circuitry of video decoder 300 may be configured to determine a prediction signal based on at least one BV in the candidate list of BVs 1010. The processing circuitry of video decoder 300 may receive residual information indicative of a difference between the prediction signal and the subsequent block 1002, and reconstruct the subsequent block 1002 based on the prediction signal and the residual information.

As one example, to encode or decode the subsequent block, the processing circuitry of video encoder 200 may be configured to encode the subsequent block 1002. To encode the subsequent block 1002, the processing circuitry of video encoder 200 may be configured to determine a prediction signal. At least one BV in the candidate list of BVs 1010 identifies or is used to identify a block used to derive the prediction signal. The processing circuitry of video encoder 200 may determine residual information indicative of a difference between the prediction signal and the subsequent block 1002. The processing circuitry of video encoder 200 may signal the residual information.

The following numbered clauses illustrate one or more aspects of the devices and techniques described in this disclosure.

Clause 1A. A method of encoding or decoding video data, the method comprising: determining that at least one of intra template matching prediction (IntraTMP) or intra block copy (IBC) is enabled for a current block; storing a block vector (BV) for the current block in a BV buffer with position information of the current block in response to the current block being encoded or decoded with IntraTMP or IBC being enabled; deriving, based on the stored BV, at least one of spatial BV candidates or temporal BV candidates for a subsequent block; and encoding or decoding the subsequent block based on the spatial BV candidates or the temporal BV candidates.

Clause 2A. The method of clause 1A, wherein storing comprises storing an integer part of the BV and discarding a fractional part of the BV.

Clause 3A. The method of any of clauses 1 and 2, wherein storing comprises rounding the BV.

Clause 4A. The method of any of clauses 1A-3A, wherein deriving comprises: deriving the spatial BV candidates in a condition where the subsequent block is in same picture as the current block; or deriving the temporal BV candidates in a condition where the subsequent block is in a different picture than the current block.

Clause 5A. The method of any of clauses 1A-4A, wherein the BV comprises a first BV, the BV buffer comprises a first BV buffer, and the current block comprises a first block, the method further comprising: determining that a vertical or horizontal part of a second BV is between –0.5 and 0.5; one of: rounding the second BV to zero to generate a rounded second BV; or rounding the second BV to a value of –1 or 1 to generate the rounded second BV; and storing the rounded second BV in a second buffer.

Clause 6A. A method of encoding or decoding video data, the method comprising: determining that at least one of intra template matching prediction (IntraTMP) or intra block copy (IBC) is enabled for a current block; storing a block vector (BV) for the current block in a history BV list in response to the current block being encoded or decoded with IntraTMP or IBC being enabled, wherein an order of the history BV list is based on a coding order of blocks including the current block; deriving, based on the stored BV, history BV candidates for a subsequent block; and encoding or decoding the subsequent block based on the history BV candidates.

Clause 7A. The method of clause 6A, wherein storing comprises storing an integer part of the BV and discarding a fractional part of the BV.

Clause 8A. The method of any of clauses 6A and 7A, wherein storing comprises rounding the BV.

Clause 9A. A method of encoding or decoding video data, the method comprising: deriving a starting point for intra template matching prediction (IntraTMP) or intra block copy (IBC) as part of a block vector (BV) candidate derivation process to generate a plurality of BV candidates; encoding or decoding a current block based on the plurality of BV candidates.

Clause 10A. The method of clause 9A, wherein, in the BV candidate derivation process, spatial candidates are derived, and then history candidates are derived.

Clause 11A. The method of clause 9A, wherein, in the BV candidate derivation process, only spatial candidates are derived for IntraTMP.

Clause 12A. The method of any of clauses 9A-11A, wherein a search range of a template matching process is based on a number of available candidates.

Clause 13A. The method of any of clauses 9A-12A, further comprising: in a condition where a distance between a new candidate and one of the plurality of BV candidates is greater than a threshold, bypassing the addition of the new candidate to the plurality of BV candidates.

Clause 14A. A method of encoding or decoding video data, the method comprising: in a condition where a direct block vector (BV) mode is applied to a current chroma block, rounding a corresponding luma BV of a current luma block to an integer value to generate a rounded luma BV; deriving a chroma BV based on the rounded luma BV; and encoding or decoding the current chroma block based on the chroma BV.

Clause 15A. A method of processing video data, the method comprising: signaling or parsing a high-level flag to indicate that overlapped block motion compensation (OBMC) applied or not for a current block that uses intra temporal matching prediction (IntraTMP) or intra block copy (IBC).

Clause 16A. A method of processing video data, the method comprising: signaling or parsing a high-level flag to indicate that overlapped block motion compensation (OBMC) applied or not when a neighboring block or a current block uses intra temporal matching prediction (In-traTMP) or intra block copy (IBC).

Clause 17A. The method of any of clauses 15A and 16A, wherein the high-level flag is one of a flag is a picture parameter set (PPS), sequence parameter set (SPS), or a slice header.

Clause 18A. A method comprising any one or combination of clauses 1A-17A.

Clause 19A. A device for encoding or decoding video data, the device comprising: a memory configured to store the video data; and processing circuitry coupled to the memory and configured to perform the method of any of clauses 1A-18A.

Clause 20A. The device of clause 19A, further comprising a display configured to display decoded video data.

Clause 21A. The device of any of clauses 19A and 20A, wherein the device comprises one or more of a camera, a computer, a mobile device, a broadcast receiver device, or a set-top box.

Clause 22A. The device of any of clauses 19A-21A, wherein the device comprises a video decoder.

Clause 23A. The device of any of clauses 19A-22A, wherein the device comprises a video encoder.

Clause 24A. A computer-readable storage medium having stored thereon instructions that, when executed, cause one or more processors to perform the method of any of clauses 1A-18A.

Clause 25A. A device for encoding or decoding video data, the device comprising means for performing the method of any of clauses 1A-18A.

Clause 1. A method of encoding or decoding video data, the method comprising: storing a block vector (BV) for a current block in a history BV list for encoding or decoding a subsequent block, wherein the current block is encoded or decoded in intra temporal motion vector prediction (In-traTMP) mode, and wherein the history BV list includes BVs for blocks that do not neighbor the subsequent block; deriving a candidate list of BVs for the subsequent block based on BVs from the history BV list that includes the BV for the current block; and encoding or decoding the subsequent block based on the candidate list of BVs.

Clause 2. The method of clause 1, wherein deriving the candidate list of BVs for the subsequent block comprises: adding BVs from blocks neighboring the subsequent block to an initial candidate list; adding BVs from the history BV list to the initial candidate list; determining template matching costs for BVs in the initial candidate list; and deriving the candidate list of BVs based on the template matching costs for the BVs in the initial candidate list.

Clause 3. The method of any of clauses 1 and 2, wherein storing the BV for the current block comprises: one of clipping or rounding an actual BV for the current block to generate a clipped or rounded BV for the current block; and storing the clipped or rounded BV for the current block.

Clause 4. The method of any of clauses 1-3, wherein the current block is not a neighboring block of the subsequent block.

Clause 5. The method of any of clauses 1-4, wherein the subsequent block is encoded or to be decoded in IntraTMP mode or intra block copy (IBC) mode.

Clause 6. The method of any of clauses 1-5, further comprising: utilizing each of the BVs in the candidate list of BVs as a starting BV for a template matching process associated with each of the BVs; and determining a prediction signal for the subsequent block based on the template matching process associated with each of the BVs, wherein encoding or decoding the subsequent block comprises encoding or decoding the subsequent block based on the prediction signal.

Clause 7. The method of any of clauses 1-6, wherein an order of BVs in the history BV list is based on coding order of the blocks including the current block.

Clause 8. The method of any of clauses 1-7, wherein encoding or decoding the subsequent block comprises decoding the subsequent block, wherein decoding the subsequent block comprises: determining a prediction signal based on at least one BV in the candidate list of BVs; receiving residual information indicative of a difference between the prediction signal and the subsequent block; and reconstructing the subsequent block based on the prediction signal and the residual information.

Clause 9. The method of any of clauses 1-7, wherein encoding or decoding the subsequent block comprises encoding the subsequent block, wherein encoding the subsequent block comprises: determining a prediction signal, wherein at least one BV in the candidate list of BVs identifies or is used to identify a block used to derive the prediction signal; determining residual information indicative of a difference between the prediction signal and the subsequent block; and signaling the residual information.

Clause 10. A device for encoding or decoding video data, the device comprising: one or more memories configured to store the video data; and processing circuitry coupled to the one or more memories, wherein the processing circuitry is configured to: store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; derive a candidate list of BVs for the subsequent block based on BVs from the history BV list that includes the BV for the current block; and encode or decode the subsequent block based on the candidate list of BVs.

Clause 11. The device of clause 10, wherein to derive the candidate list of BVs for the subsequent block, the processing circuitry is configured to: add BVs from blocks neighboring the subsequent block to an initial candidate list; add BVs from the history BV list to the initial candidate list; determine template matching costs for BVs in the initial candidate list; and derive the candidate list of BVs based on the template matching costs for the BVs in the initial candidate list.

Clause 12. The device of any of clauses 10 and 11, wherein to store the BV for the current block, the processing circuitry is configured to: one of clip or round an actual BV for the current block to generate a clipped or rounded BV for the current block; and store the clipped or rounded BV for the current block.

Clause 13. The device of any of clauses 10-12, wherein the current block is not a neighboring block of the subsequent block.

Clause 14. The device of any of clauses 10-13, wherein the subsequent block is encoded or to be decoded in IntraTMP mode or intra block copy (IBC) mode.

Clause 15. The device of any of clauses 10-14, wherein the processing circuitry is configured to: utilize each of the BVs in the candidate list of BVs as a starting BV for a template matching process associated with each of the BVs; and determine a prediction signal for the subsequent block based on the template matching process associated with each of the BVs, wherein to encode or decode the subsequent block, the processing circuitry is configured to encode or decode the subsequent block based on the prediction signal.

Clause 16. The device of any of clauses 10-15, wherein an order of BVs in the history BV list is based on coding order of the blocks including the current block.

Clause 17. The device of any of clauses 10-16, wherein to encode or decode the subsequent block comprises, the processing circuitry is configured to decode the subsequent block, wherein to decode the subsequent block, the processing circuitry is configured to: determine a prediction signal based on at least one BV in the candidate list of BVs; receive residual information indicative of a difference between the prediction signal and the subsequent block; and reconstruct the subsequent block based on the prediction signal and the residual information.

Clause 18. The device of any of clauses 10-16, wherein to encode or decode the subsequent block, the processing circuitry is configured to encode the subsequent block, wherein to encode the subsequent block, the processing circuitry is configured to: determine a prediction signal, wherein at least one BV in the candidate list of BVs identifies or is used to identify a block used to derive the prediction signal; determine residual information indicative of a difference between the prediction signal and the subsequent block; and signal the residual information.

Clause 19. The device of any of clauses 10-18, wherein the device comprises one or more of a camera, a computer, a mobile device, a broadcast receiver device, or a set-top box.

Clause 20. A computer-readable storage medium having stored thereon instructions that, when executed, cause one or more processors to: store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block; derive a candidate list of BVs for the subsequent block based on BVs from the history BV list that includes the BV for the current block; and encode or decode the subsequent block based on the candidate list of BVs.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:

storing a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block;

deriving a candidate list of BVs for the subsequent block based on BVs from the history BV list that includes the BV for the current block; and encoding or decoding the subsequent block based on the candidate list of BVs.

2. The method of claim 1, wherein deriving the candidate list of BVs for the subsequent block comprises:

adding BVs from blocks neighboring the subsequent block to an initial candidate list;

adding BVs from the history BV list to the initial candidate list;

determining template matching costs for BVs in the initial candidate list; and deriving the candidate list of BVs based on the template matching costs for the BVs in the initial candidate list.

3. The method of claim 1, wherein storing the BV for the current block comprises:

one of clipping or rounding an actual BV for the current block to generate a clipped or rounded BV for the current block; and storing the clipped or rounded BV for the current block.

4. The method of claim 1, wherein the current block is not a neighboring block of the subsequent block.

5. The method of claim 1, wherein the subsequent block is encoded or to be decoded in IntraTMP mode or intra block copy (IBC) mode.

6. The method of claim 1, further comprising:

utilizing each of the BVs in the candidate list of BVs as a starting BV for a template matching process associated with each of the BVs; and determining a prediction signal for the subsequent block based on the template matching process associated with each of the BVs, wherein encoding or decoding the subsequent block comprises encoding or decoding the subsequent block based on the prediction signal.

7. The method of claim 1, wherein an order of BVs in the history BV list is based on coding order of the blocks including the current block.

8. The method of claim 1, wherein encoding or decoding the subsequent block comprises decoding the subsequent block, wherein decoding the subsequent block comprises:

determining a prediction signal based on at least one BV in the candidate list of BVs;

receiving residual information indicative of a difference between the prediction signal and the subsequent block; and reconstructing the subsequent block based on the prediction signal and the residual information.

9. The method of claim 1, wherein encoding or decoding the subsequent block comprises encoding the subsequent block, wherein encoding the subsequent block comprises:

determining a prediction signal, wherein at least one BV in the candidate list of BVs identifies or is used to identify a block used to derive the prediction signal;

determining residual information indicative of a difference between the prediction signal and the subsequent block; and signaling the residual information.

10. A device for encoding or decoding video data, the device comprising:

one or more memories configured to store the video data; and processing circuitry coupled to the one or more memories, wherein the processing circuitry is configured to:

store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block;

derive a candidate list of BVs for the subsequent block based on BVs from the history BV list that includes the BV for the current block; and encode or decode the subsequent block based on the candidate list of BVs.

11. The device of claim 10, wherein to derive the candidate list of BVs for the subsequent block, the processing circuitry is configured to:

add BVs from blocks neighboring the subsequent block to an initial candidate list;

add BVs from the history BV list to the initial candidate list;

determine template matching costs for BVs in the initial candidate list; and derive the candidate list of BVs based on the template matching costs for the BVs in the initial candidate list.

12. The device of claim 10, wherein to store the BV for the current block, the processing circuitry is configured to:

one of clip or round an actual BV for the current block to generate a clipped or rounded BV for the current block; and store the clipped or rounded BV for the current block.

13. The device of claim 10, wherein the current block is not a neighboring block of the subsequent block.

14. The device of claim 10, wherein the subsequent block is encoded or to be decoded in IntraTMP mode or intra block copy (IBC) mode.

15. The device of claim 10, wherein the processing circuitry is configured to:

utilize each of the BVs in the candidate list of BVs as a starting BV for a template matching process associated with each of the BVs; and determine a prediction signal for the subsequent block based on the template matching process associated with each of the BVs, wherein to encode or decode the subsequent block, the processing circuitry is configured to encode or decode the subsequent block based on the prediction signal.

16. The device of claim 10, wherein an order of BVs in the history BV list is based on coding order of the blocks including the current block.

17. The device of claim 10, wherein to encode or decode the subsequent block comprises, the processing circuitry is configured to decode the subsequent block, wherein to decode the subsequent block, the processing circuitry is configured to:

determine a prediction signal based on at least one BV in the candidate list of BVs;

receive residual information indicative of a difference between the prediction signal and the subsequent block; and reconstruct the subsequent block based on the prediction signal and the residual information.

18. The device of claim 10, wherein to encode or decode the subsequent block, the processing circuitry is configured to encode the subsequent block, wherein to encode the subsequent block, the processing circuitry is configured to:

determine a prediction signal, wherein at least one BV in the candidate list of BVs identifies or is used to identify a block used to derive the prediction signal;

determine residual information indicative of a difference between the prediction signal and the subsequent block; and signal the residual information.

19. The device of claim 10, wherein the device comprises one or more of a camera, a computer, a mobile device, a broadcast receiver device, or a set-top box.

20. A computer-readable storage medium having stored thereon instructions that, when executed, cause one or more processors to:

store a block vector (BV) for a current block in a history BV list for encoding or decoding a subsequent block, wherein the current block is encoded or decoded in intra temporal motion vector prediction (IntraTMP) mode, and wherein the history BV list includes BVs for blocks that do not neighbor the subsequent block;

derive a candidate list of BVs for the subsequent block based on BVs from the history BV list that includes the BV for the current block; and encode or decode the subsequent block based on the candidate list of BVs.

* * * * *